US010031329B2

(12) United States Patent
Donaldson et al.

(10) Patent No.: US 10,031,329 B2
(45) Date of Patent: Jul. 24, 2018

(54) OFF-AXIS OPTICAL TELESCOPE

(71) Applicant: The Boeing Company, Chicago, IL (US)

(72) Inventors: Jed Eden Donaldson, Bernallilo, NM (US); Joseph Nolan Paranto, Albuquerque, NM (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/825,339

(22) Filed: Aug. 13, 2015

(65) Prior Publication Data
US 2017/0045731 A1 Feb. 16, 2017

(51) Int. Cl.
G02B 23/24 (2006.01)
G02B 23/02 (2006.01)
(Continued)

(52) U.S. Cl.
CPC ......... *G02B 23/2446* (2013.01); *G02B 23/02* (2013.01); *G02B 23/06* (2013.01); *G02B 23/16* (2013.01); *G02B 26/0816* (2013.01)

(58) Field of Classification Search
CPC ........ G02B 23/00; G02B 23/02; G02B 23/06; G02B 23/16; G02B 23/2446; G02B 17/00;
(Continued)

(56) References Cited

U.S. PATENT DOCUMENTS 4,168,908 A * 9/1979 Cubalchini ............. G01S 17/66
250/203.1
4,215,273 A 7/1980 Stokes et al.
(Continued)

FOREIGN PATENT DOCUMENTS

EP 2525235 A1 11/2012

OTHER PUBLICATIONS

U.S. Appl. No. 14/701,976, filed May 1, 2015, entitled *Method and Apparatus for Stabilizing a Line of Sight of a Radiant Energy System*.
(Continued)

*Primary Examiner* — Stephone B Allen
*Assistant Examiner* — Adam W Booher
(74) *Attorney, Agent, or Firm* — Alston & Bird LLP

(57) ABSTRACT

An optical telescope is provided that includes a steering mirror configured to receive and redirect optical signals. The steering mirror is configured to be controllably oriented so as to control a direction in which the optical signals are redirected and to correspondingly control a line of sight. The optical telescope also includes a beam tube that includes a turning mirror configured to receive the optical signals from the steering mirror. The optical telescope also includes a primary mirror downstream of the turning mirror and configured to collimate the optical signals. Further, the optical telescope includes an output mirror configured to receive the optical signals from the primary mirror and to redirect the optical signals from the optical telescope. The output mirror is configured to be controllably oriented so as to control a direction in which the optical signals are redirected and to correspondingly control the line of sight.

19 Claims, 6 Drawing Sheets

(51) Int. Cl.
*G02B 23/06* (2006.01)
*G02B 23/16* (2006.01)
*G02B 26/08* (2006.01)

(58) Field of Classification Search
CPC .... G02B 17/008; G02B 17/02; G02B 17/023; G02B 17/026; G02B 17/06; G02B 17/0605; G02B 17/0615; G02B 17/0621; G02B 17/0626; G02B 17/0636; G02B 17/0642; G02B 17/0647; G02B 17/0657; G02B 17/0663; G02B 17/08; G02B 17/0804; G02B 17/0812; G02B 17/0816; G02B 17/082; G02B 17/0828; G02B 17/0832; G02B 17/0836; G02B 17/0844; G02B 17/0848; G02B 7/182; G02B 7/1821; G02B 7/1822; G02B 7/1827; G02B 7/183; G02B 7/198; F41H 11/02; F41H 13/0043–13/0062; F41H 13/0087; G01S 7/38; G01S 7/495; G01S 17/00–17/95
See application file for complete search history.

(56) References Cited

U.S. PATENT DOCUMENTS

| | | | |
|---|---|---|---|
| 6,555,803 | B1 | 4/2003 | Bremer |
| 2005/0180026 | A1 | 8/2005 | Pohle |
| 2011/0103410 | A1* | 5/2011 | Hutchin ............. F41H 13/0062 372/9 |
| 2012/0069463 | A1* | 3/2012 | Miller .................. G02B 7/1827 359/849 |
| 2012/0298839 | A1* | 11/2012 | King ...................... F41A 23/20 250/203.1 |
| 2015/0049375 | A1* | 2/2015 | Hutchin ............. G02B 26/0816 359/221.3 |

OTHER PUBLICATIONS

Extended European Search. Report for European Patent Application No. 16183319.9 dated Jan. 4, 2017, 8 pages.

\* cited by examiner

OFF-AXIS OPTICAL TELESCOPE

TECHNOLOGICAL FIELD

An example embodiment relates generally to an optical telescope and, more particularly, to an off-axis optical telescope that may be utilized in a variety of applications including laser surveying and laser communication.

BACKGROUND

Optical telescopes are utilized for a wide variety of purposes. For example, optical telescopes may be utilized for laser surveying or laser communications. With respect to laser surveying, an optical telescope may support light detection and ranging (LiDAR) in which a distance measurement is obtained by illuminating a target with a laser and subsequently analyzing the reflected light. As such, optical telescopes may support topographic surveying. In addition, optical telescopes may support laser communications including air-to-ground communications, ground-to-ground communications, surface-to-ground communications, surface-to-surface communications, and/or air-to-surface communications. As used herein, "surface" may refer not only to ground, but to other types of surfaces, such as the surface of bodies of water.

In some applications, the size and weight that may be allocated for an optical telescope is limited, thereby also constraining the optical telescopes that may be utilized in such applications. Further, some applications may require a relatively large aperture and field of regard which may, in turn, limit the optical telescopes that may effectively service such applications due to constraints upon the aperture and field of regard imposed by some optical telescopes. In this context, the field of regard is the area covered by a detector when pointing to all mechanically possible positions. Further, some optical telescopes may include a number of refractive optical elements which may, in turn, limit or prevent the integration of multi-spectral sensing and lasers which may be desirable in some applications.

BRIEF SUMMARY

An optical telescope is provided in accordance with an example embodiment of the present disclosure. As a result of its geometric layout and its off-axis configuration, the optical telescope of an example embodiment may have a relative small size and a relatively low weight so as to qualify the optical telescope for a wide variety of applications including those applications that limit the size and weight that may be allocated to an optical telescope. Additionally, the optical telescope of an example embodiment may have a relatively wide aperture and field of regard such that the optical telescope can service applications that demand a broad aperture and field of regard. Indeed, the optical telescope of an example embodiment has a large aperture size in a small package size, while providing for agile scanning and pointing with a fast steering mirror, a hemispherical field of regard as a result of the geometry of the optical telescope and base motion stabilization due to the closed loop gyroscope control configuration. Further, the optical telescope of an example embodiment limits the number of refractive optical elements so as to support the integration of multi-spectral sensing and lasers. Thus, the optical telescope of an example embodiment may be employed in a wide variety of applications including laser surveying and laser communication.

In an example embodiment, an optical telescope is provided that includes a steering mirror configured to receive and redirect optical signals. The steering mirror is configured to be controllably oriented so as to control a direction in which the optical signals are redirected and to correspondingly control a line of sight of the optical telescope. The optical telescope of this example embodiment also includes a beam tube that includes a turning mirror configured to receive the optical signals from the steering mirror. The optical telescope of this example embodiment also includes a primary mirror downstream of the turning mirror and configured to collimate the optical signals. Further, the optical telescope of this example embodiment includes an output mirror configured to receive the optical signals from the primary mirror and to redirect the optical signals from the optical telescope. The output mirror is configured to be controllably oriented so as to control a direction in which the optical signals are redirected and to correspondingly control an elevation angle of the line of sight of the optical telescope.

The steering mirror of an example embodiment is configured to rotate about first and second axes and the output mirror is configured to rotate about the second axis, perpendicular to the first axis. The optical telescope of an example embodiment also includes a fold mirror configured to receive the optical signals from the turning mirror and to redirect the optical signals. In this example embodiment, the optical telescope may also include a secondary mirror configured to receive the optical signals from the fold mirror and to redirect the optical signals to the primary mirror. The secondary mirror may be configured to cause the optical signals to be expanded. The optical telescope of an example embodiment also includes one or more inertial angular rate sensors associated with an azimuthal angle of the optical telescope to sense an inertial angular velocity of the steering mirror as well as one or more inertial angular rate sensors associated with an elevation angle of the optical telescope to sense the inertial angular velocity of the output mirror. The output mirror of an example embodiment has an elliptic shape.

In another example embodiment, an optical telescope is provided that includes a base, a platform carried by the base and one or more upstanding supports extending outwardly from the platform. The optical telescope of this example embodiment also includes a steering mirror configured to receive and to redirect optical signals. The steering mirror is configured to be controllably rotated so as to control a direction in which the optical signals are redirected. The optical telescope of this example embodiment also includes a beam tube carried by the one or more upstanding supports and including a turning mirror configured to receive the optical signals from the steering mirror. The optical telescope of this example embodiment also includes a primary mirror carried by the one or more upstanding supports and positioned downstream off the turning mirror so as to collimate the optical signals. The optical telescope of this example embodiment also includes an output mirror carried by the one or more upstanding supports and configured to receive the optical signals from the primary mirror and to redirect the optical signals from the optical telescope. The output mirror is configured to be controllably rotated relative to the one or more upstanding supports so as to control a direction in which the optical signals are redirected.

In an example embodiment, the steering mirror is configured to rotate about first and second axes and the output mirror is configured to rotate about the second axis, perpendicular to the first axis. The optical telescope of an example embodiment also includes a fold mirror carried by the one or more upstanding supports and configured to receive the optical signals from the turning mirror and to redirect the optical signals. The optical telescope of this example embodiment also includes a secondary mirror carried by the one or more upstanding supports and configured to receive the optical signals from the fold mirror and to redirect the optical signals to the primary mirror. The secondary mirror of this example embodiment may also be configured to cause the optical signals to be expanded. The optical telescope of an example embodiment also includes one or more inertial angular rates sensors associated with an azimuthal axis of the optical telescope to sense the inertial angular velocity of the steering mirror and one or more inertial angular rate sensors associated with an elevation angle of the optical telescope to sense the inertial angular velocity of the output mirror. The output mirror of an example embodiment has an elliptic shape. The base of an example embodiment has a cylindrical shape.

In a further example embodiment, an optical telescope is provided that includes a base, a platform carried by the base and a plurality of stanchions extending outwardly from the platform. The optical telescope of this example embodiment also includes a steering mirror configured to receive and to redirect optical signals. The optical telescope of this example embodiment also includes a beam tube carried by a first stanchion and comprising a turning mirror configured to receive the optical signals from the steering mirror and to redirect the optical signals. The optical telescope of this example embodiment also includes a fold mirror carried by a second stanchion and configured to receive the optical signals from the turning mirror and to redirect the optical signals. The optical telescope of this example embodiment also includes a secondary mirror carried by a third stanchion and configured to receive the optical signals for the fold mirror and to redirect the optical signals. The optical telescope of this example embodiment further includes a primary mirror carried by the second stanchion and configured to receive the optical signals from the secondary mirror and to collimate the optical signals. Further, the optical telescope of this example embodiment includes an output mirror carried by the third stanchion and configured to receive the optical signal from the primary mirror and to redirect the optical signals from the optical telescope.

The steering mirror of an example embodiment is configured to rotate about first and second axes and the output mirror is configured to rotate about the second axis, perpendicular to the first axis. The secondary mirror of an example embodiment is configured to cause the optical signals to be expanded. The optical telescope of an example embodiment also includes one or more inertial angular rate sensors associated with an azimuthal axis of the optical telescope that sense an inertial angular velocity of the steering mirror and one or more inertial angular rates sensors associated with an elevation angle of the optical telescope that sense the inertial angular velocity of the output mirror. The base of an example embodiment has a cylindrical shape.

BRIEF DESCRIPTION OF THE DRAWINGS

Figure 1:
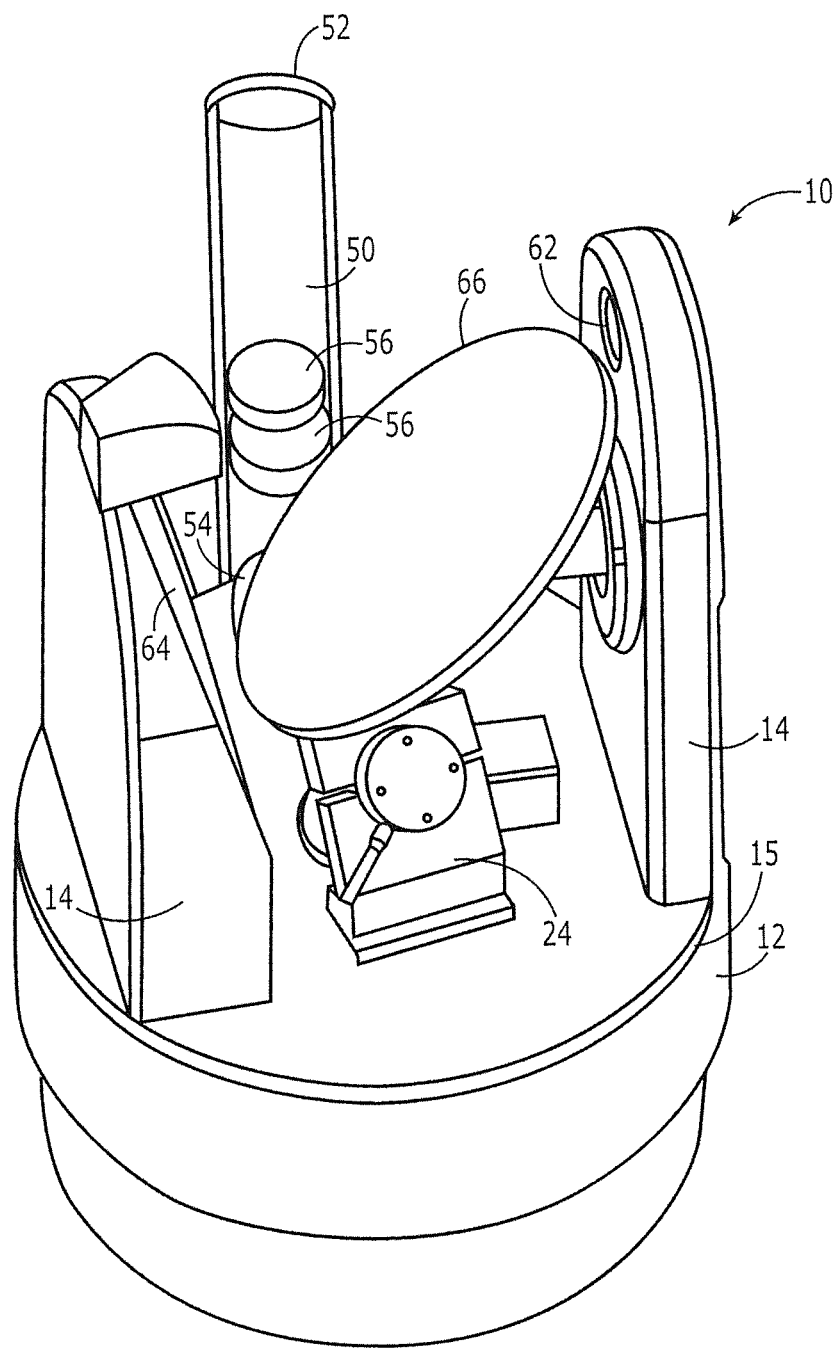
Figure 2:
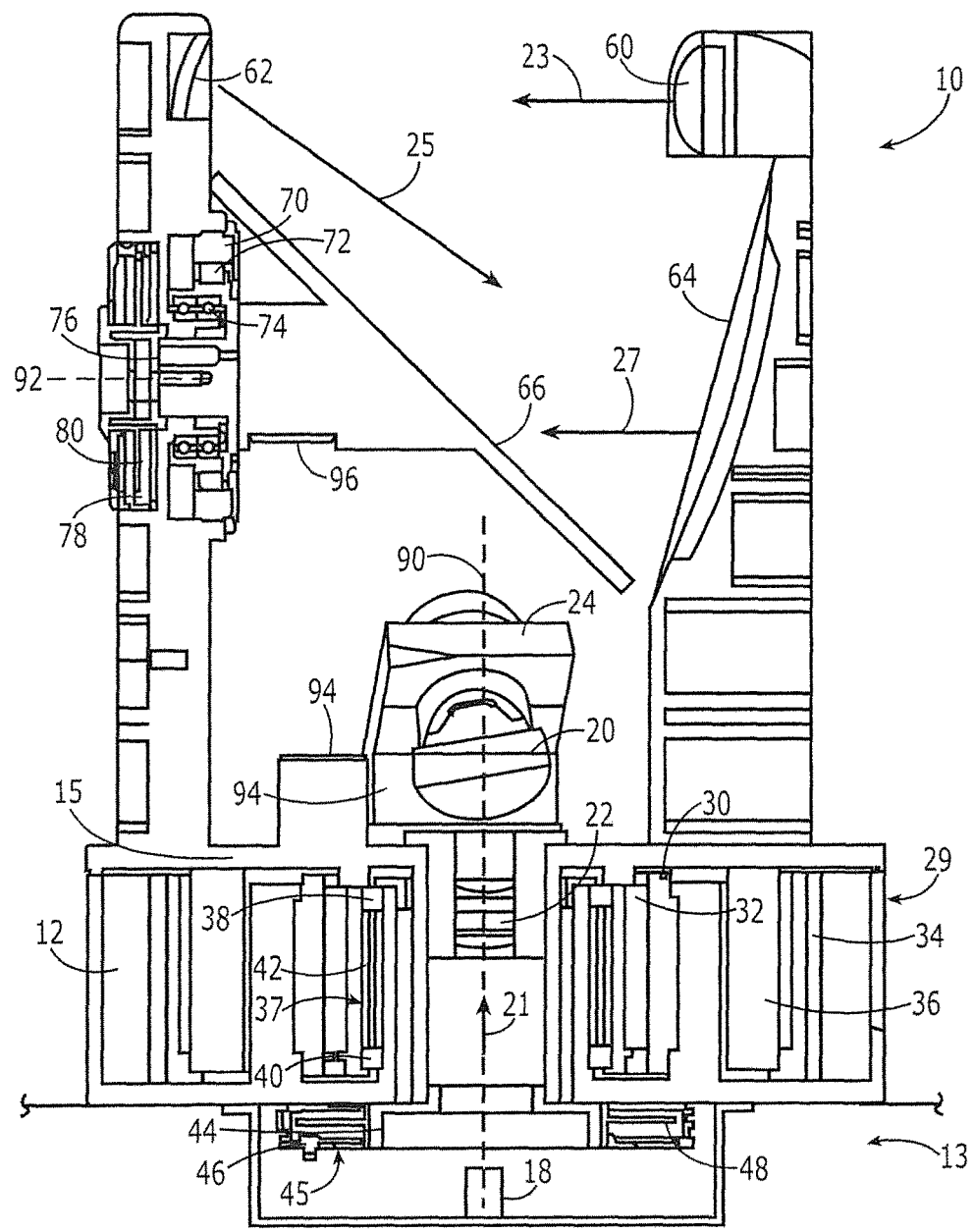
Figure 3:
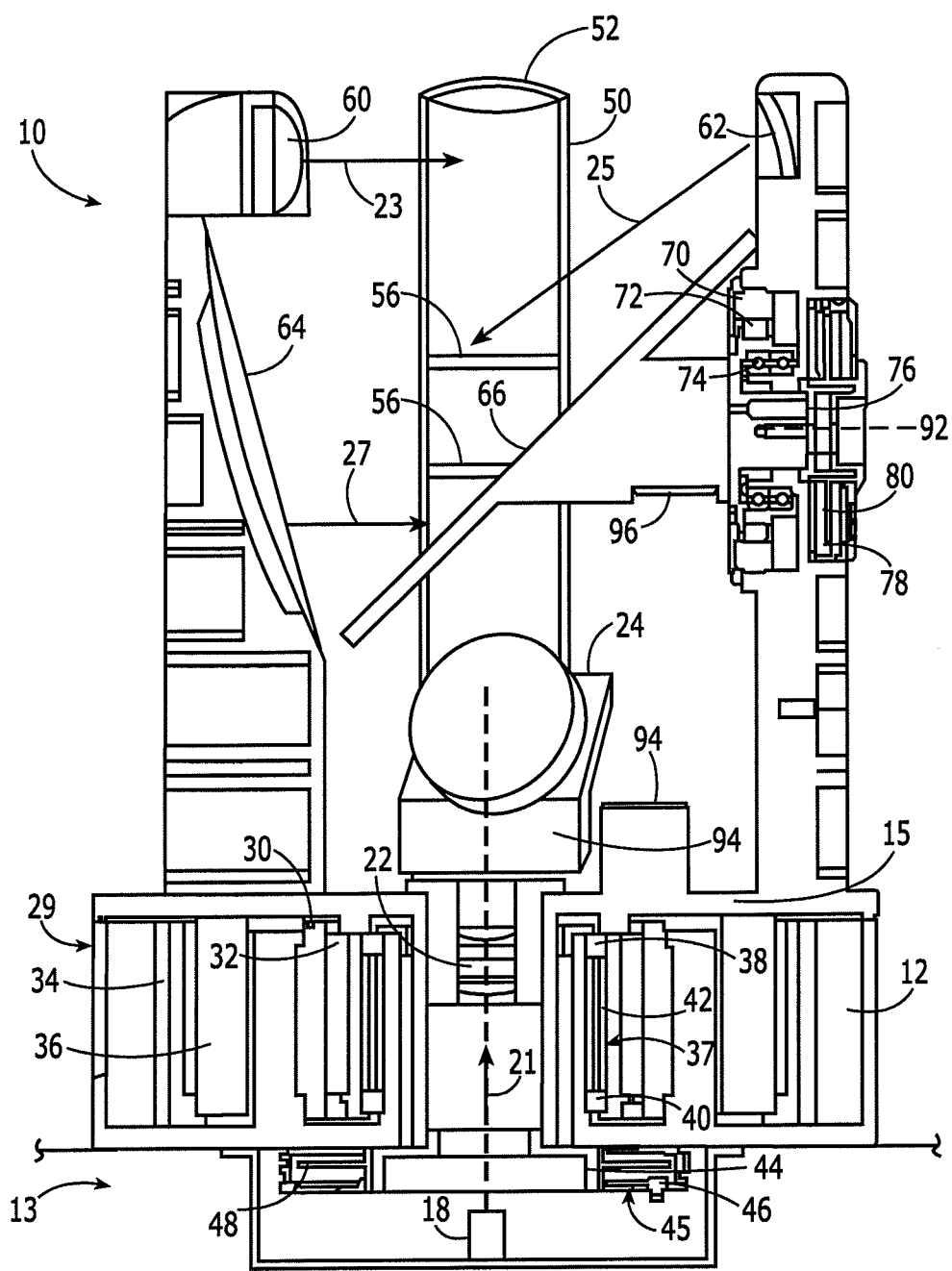
Figure 4:
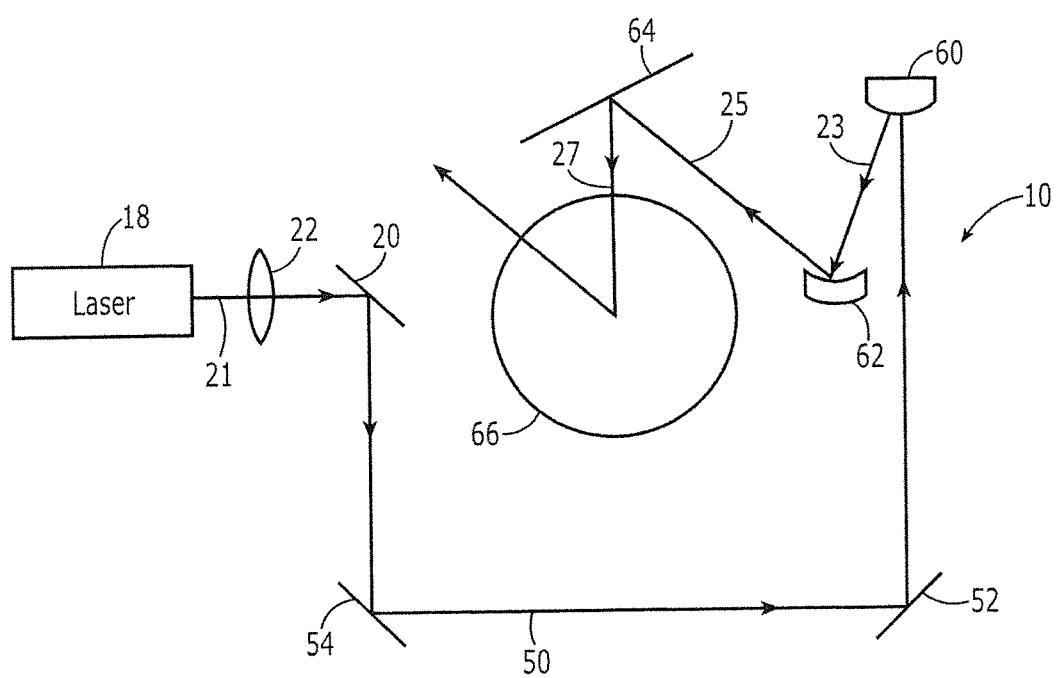
Figure 5:
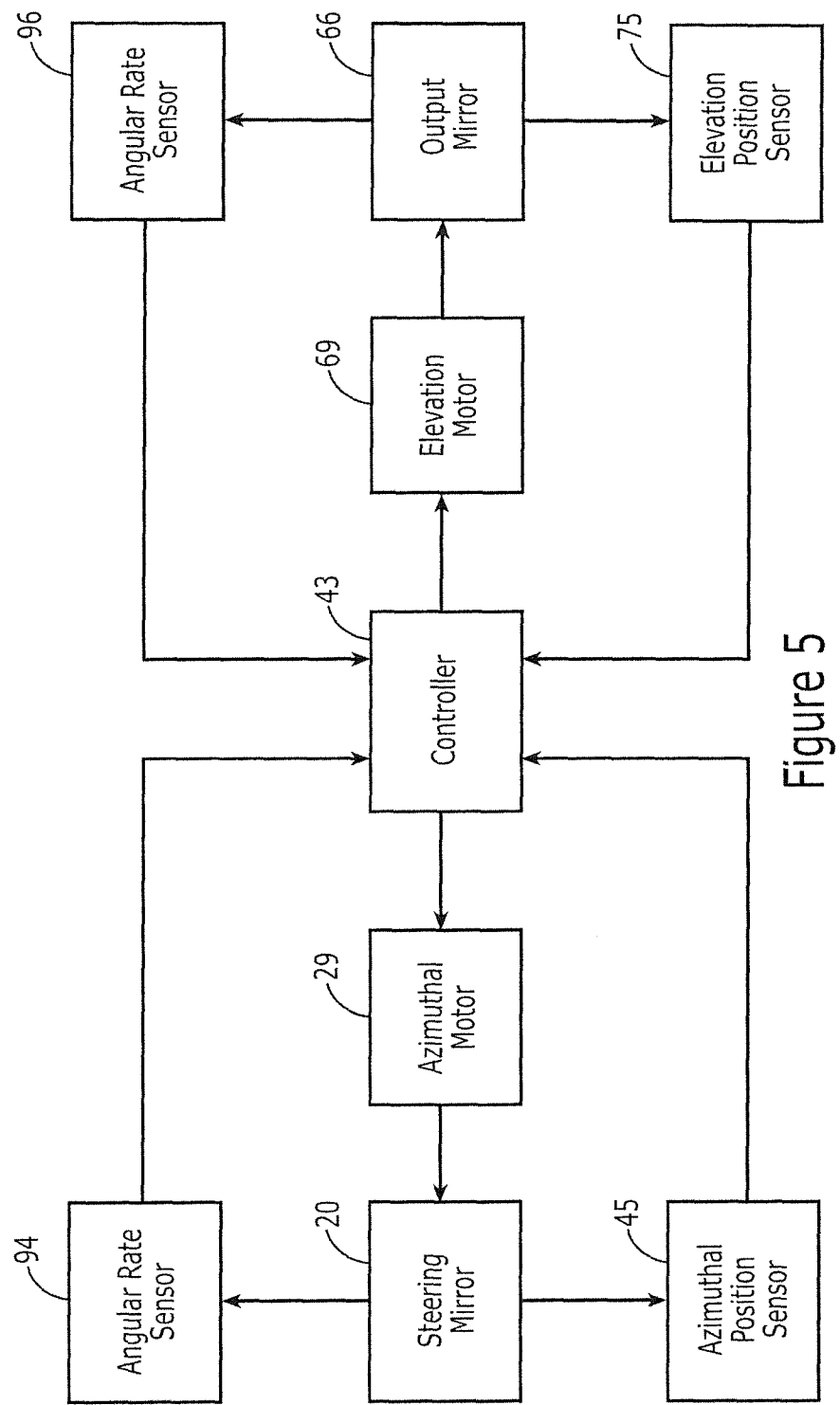
Figure 6:
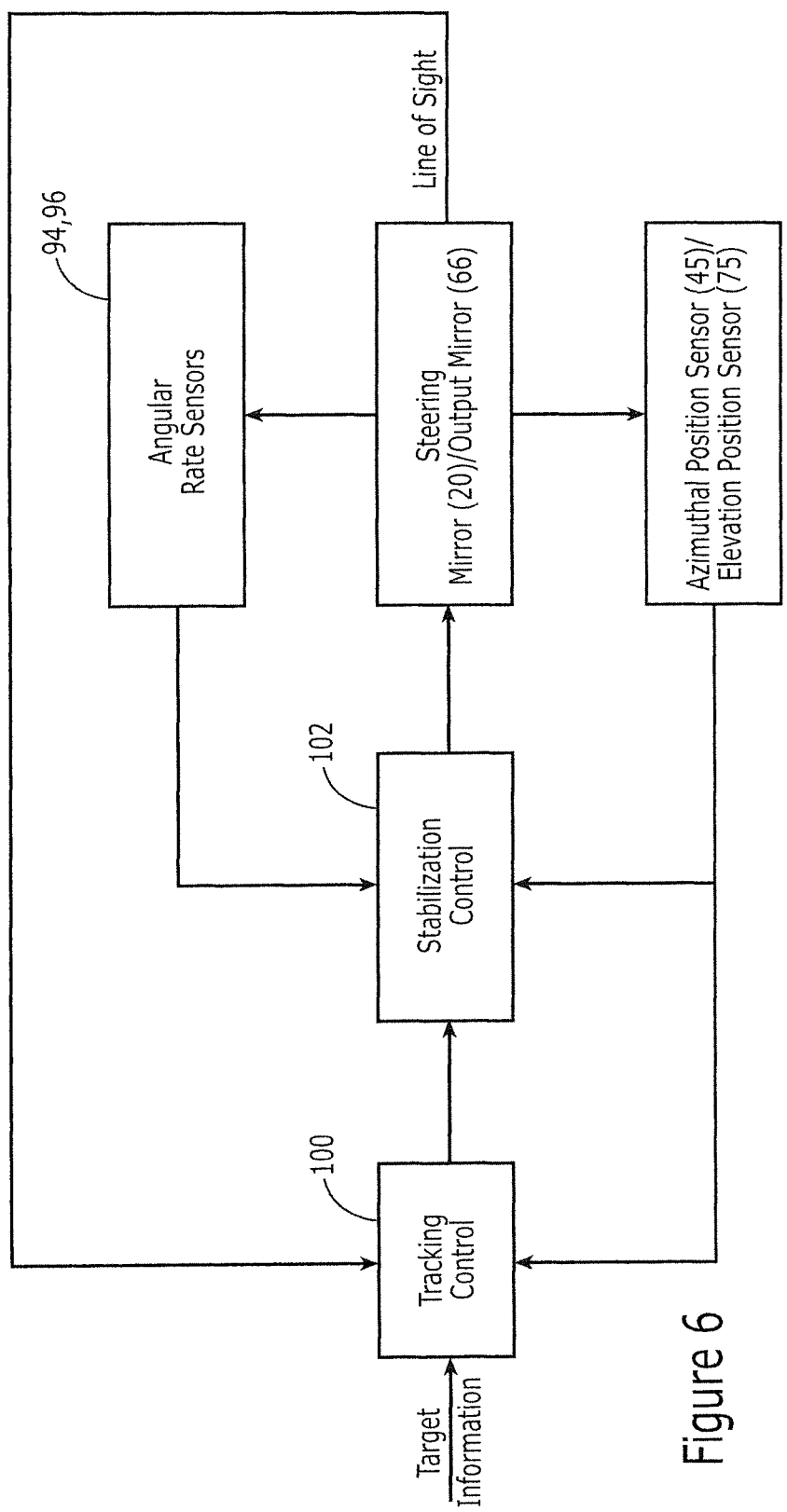

Having thus described embodiments of the present disclosure in general terms, reference will now be made to the accompanying drawings, which are not necessarily drawn to scale, and wherein;

FIG. 1 is a perspective view of an optical telescope in accordance with an example embodiment of the present disclosure;

FIG. 2 is a cross-sectional side view of the optical telescope of FIG. 1 in accordance with an example embodiment of the present disclosure;

FIG. 3 is a cross-sectional side view of the optical telescope of FIG. 1 taken in the opposite direction from that shown in FIG. 2;

FIG. 4 is a schematic representation of the path of optical signals through the optical telescope of an example embodiment of the present disclosure;

FIG. 5 is a block diagram of components of the optical telescope of an example embodiment of the present disclosure that illustrates the feedback employed for stabilization purposes; and FIG. 6 is a control diagram of operations performed by a controller with respect to a line of sight of the optical telescope in accordance with an example embodiment of the present disclosure.

DETAILED DESCRIPTION

Embodiments of the present disclosure now will be described more fully hereinafter with reference to the accompanying drawings, in which some, but not all embodiments are shown. Indeed, these embodiments may be embodied in many different form's and should not be construed as limited to the embodiments set forth herein; rather, these embodiments are provided so that this disclosure will satisfy applicable legal requirements. Like numbers refer to like elements throughout.

An optical telescope, such as a coeloscope, is provided in accordance with an example embodiment. The optical telescope may be utilized for a wide variety of applications including, for example, laser surveying and laser communications. With respect to laser surveying, the optical telescope may support topographical surveying and/or LiDAR-based surveys. With respect to laser communications, the optical telescope is configured to support a wide range of laser communications including air-to-ground communications, ground-to-ground communications, surface-to-ground communications, surface-to-surface communications and/or air-to-surface communications.

Although the optical telescope may be configured in various manners, the optical telescope 10 of an example embodiment is depicted in FIG. 1. As shown, the optical telescope 10 includes a base 12 and one or more upstanding supports 14 extending outwardly from the base. In this example embodiment, the base 12 has a cylindrical shape and the optical telescope 10 including the base and the one or more upstanding supports 14 is configured to be received within a cylindrical volume. In the illustrated embodiment, the one or more upstanding supports 14 include a plurality of stanchions, such as first, second and third stanchions, extending outwardly from the base 12. However, the one or more upstanding supports 14 may be configured in other manners including, for example, as a cylindrical sidewall that extends outwardly about all or a portion of the periphery of the base 12.

The base 12 may be mounted to a bench 13, as shown in FIGS. 2 and 3. The bench 13, in turn, may be carried by a vehicle, such as an aircraft or other airborne vehicle, a space vehicle, a ground vehicle, a marine or other water-based vehicle or the like. Alternatively, the bench 13 may be a fixed structure. In an embodiment in which the optical telescope 10 is configured to transmit optical signals, the bench 13 and/or the base 12 may carry or otherwise house a laser 18 that generates the optical signals 21 controllably transmitted by the optical telescope, such as for laser surveying, laser communication or other applications. Additionally or alternatively, in an embodiment in which the optical telescope is configured to receive optical signals, the bench 13 and/or the base 12 may carry or otherwise house a detector or other type of receiver for receiving the optical signals. For purposes of explanation but not of limitation, the optical telescope 10 will hereinafter be described in conjunction with the transmission of optical signals although the optical telescope may be similarly utilized for the reception of optical signals.

As shown in FIG. 1 and in cross-section in FIGS. 2 and 3, the optical telescope 10 includes a plurality of optical elements for controllably directing the optical signals generated by the laser so as to control both the azimuthal angle and the elevation angle of the optical telescope. In this regard, the optical telescope 10 includes a steering mirror 20 configured to receive optical signals from the laser 18 and to redirect the optical signals. Typically, the steering mirror 20 has a circular shape, but only one-half of the steering mirror is shown in FIG. 2 with the other half of the steering mirror being removed for purposes of illustration such that other components rearward of the steering mirror can be seen. In the orientation depicted in FIGS. 1-3, the laser is carried by the base 12 or the bench 13 and is oriented so as to emit optical signals that propagate upwardly, such as vertically, through the base to the steering mirror 20 which, in turn, redirects the optical signals, such as in a direction approximately perpendicular to the direction in which the optical signals from the laser are delivered to the steering mirror. In the example embodiment depicted in FIGS. 2 and 3 and as shown by the schematic representation in FIG. 4 of the path of the optical signals, the optical telescope 10, such as the base 12, includes one or more optical elements 22, such as lenses, positioned between the laser 18 and the steering mirror 20 in order to direct the optical signals to the steering mirror.

Although the steering mirror 20 may be configured in various manners, the optical telescope 10 of the illustrated embodiment includes a steering mirror assembly that includes a housing 24 carried by and rotatable with a platform 15 and the steering mirror carried, in turn, by the housing. The steering mirror 20 is configured to be controllably oriented so as to control the direction in which the optical signals are redirected and to correspondingly control the line of sight of the optical telescope 10. For example, the steering mirror 20 may be controllably oriented so as to correspondingly control the azimuthal and elevation angles of the line of sight of the optical telescope 10, or to be independent of the azimuthal and elevation angles in embodiments in which the first and second axes are not aligned with the azimuthal and elevation axes, respectively. In an example embodiment, the platform 15 is carried by the base 12 and is configured to be rotated relative to the base and the bench 13 with the rotation of the platform, in turn, causing rotation of the steering mirror 20 relative to the base and the bench. Although the platform 15 may be configured to rotate relative to the base 12 in various manners, the optical telescope 10 of an example embodiment includes an azimuthal motor 29, such as a DC motor, disposed within the base. As shown in FIGS. 2 and 3, the azimuthal motor 29 includes an azimuthal motor stator 30, an azimuthal motor rotor 32, a slip ring brush block 34 and a slip ring rotor 36. Additionally, the base 12 of this example embodiment includes an azimuthal bearing 37 including an azimuthal bearing upper element 38, an azimuthal bearing lower element 40 and an azimuthal bearing spacer 42 to facilitate controlled rotation of the base relative to the bench. Thus, the base 12 may controllably rotate the platform 15 relative to the bench in order to correspondingly cause the steering mirror 20 to be rotated with the base relative to the bench 13.

As described below and as shown in FIG. 5, the rotation of the platform 15 and, in turn, the steering mirror 20 relative to the base 12 and the bench 13 may be directed by a controller 43, such as a computing device, that is in communication with the azimuthal motor 29. The controller 43 may be embodied in a number of different ways. For example, the controller 43 may be embodied as one or more of various hardware processing means such as one or more processors, a coprocessor, a microprocessor, a digital signal processor (DSP), a processing element with or without an accompanying DSP, or various other types of processing circuitry including integrated circuits such as, for example, an ASIC (application specific integrated circuit), an FPGA (field programmable gate array), a microcontroller unit (MCU), a hardware accelerator, a special-purpose computer chip, or the like.

The base 12 of an example embodiment is also configured to determine the position, such as a rotational position, of the platform 15 and correspondingly the steering mirror 20 relative to the base and the bench 13. In this regard, the base 12 of an example embodiment also includes an azimuthal position sensor 45 including an azimuthal position sensor hub 44, an azimuthal position sensor stator 46 and an azimuthal position sensor rotor 48 for determining the position of the platform 15 relative to the bench 13. As also shown in FIG. 5, the azimuthal position sensor 45 may communicate with the controller 43 such that the controller, in turn, can direct the azimuthal motor 29 in order to controllably rotate the platform 15 with respect to the base 12 and the bench 13 based upon the current position of the platform relative to the bench.

As shown in FIGS. 1 and 4, the optical telescope 10 also includes a beam tube 50 including a turning mirror 52 configured to receive the optical signals from the steering mirror 20 and to redirect the optical signals. The beam tube 50 may also include an optical element, such as a turning flat 54, for initially receiving the optical signals from the steering mirror 20 and for, in turn, redirecting the optical signals through the beam tube to the turning mirror 52. As such, the turning flat 54 and the turning mirror 52 may be positioned at opposite ends of the beam tube 50. In an example embodiment, the turning flat may have an elliptic shape. The beam tube 50 also optionally includes one or more additional optical elements 56 positioned between the turning flat 54 and the turning mirror 52 in order to controllably direct the optical signals received from the steering mirror 20 to the turning mirror. As shown in FIG. 1, the beam tube 50 is carried by one or more of the upstanding supports 14, such as by a first stanchion extending outwardly from the platform 15. In the illustrated embodiment, the turning flat 54 is carried by the first stanchion at a location proximate the platform 15, the turning mirror 52 is carried by an opposite end of the first stanchion at a location spaced apart from the platform and the other optical elements 56 are positioned therebetween.

The optical telescope 10 of an example embodiment also includes a fold mirror 60, such as a turning flat, carried by the one or more upstanding supports 14. In this regard, a turning flat is a planar optical element configured to redirect the optical signals. In the illustrated embodiment, the fold mirror 60 is carried by a second stanchion. The fold mirror 60 is configured to receive the optical signals from the turning mirror 52 of the beam tube 50 and to redirect the optical signals 23. In this regard, the optical telescope 10 of the example embodiment also includes a secondary mirror 62 carried by the one or more upstanding supports 14, such as by a third stanchion. The secondary mirror 62 is configured to receive the optical signals from the fold mirror 60 and to redirect the optical signals. The secondary mirror 62 may have a curved shape so as to cause the optical signals redirected thereby to be expanded.

The optical telescope 10 of the illustrated embodiment also includes a primary mirror 64 carried by the one or more upstanding supports 14, such as by the second stanchion that also carries the fold mirror 60. The primary mirror may be disposed at an angle relative to the central axis 90 of the optical telescope 10 in order to receive the optical signals 23 from the secondary mirror 62 and, in turn, to redirect the optical signals 25 in the desired manner. In this regard, the primary mirror 64 may be a collimating optical element so as to collimate the optical signals. The primary mirror of an example embodiment is configured to be controllably rotated 360° in azimuth so as to provide for a hemispherical field of regard.

Further, the optical telescope 10 of the illustrated embodiment includes an output mirror 66 configured to receive the optical signals 25 from the primary mirror 64 and to redirect the optical signals 27 from the optical telescope, such as to be utilized for laser surveying, laser communications or other applications. The output mirror 66 is also carried by an upstanding support 14, such as by the third stanchion that also carriers the secondary mirror 62. The output mirror 66 is configured to be controllably oriented, such as by being controllably rotated relative to the upstanding support 14, such as relative to the third stanchion, so as to control the direction, such as the elevation angle, at which the optical signals are directed from the optical telescope 10. The output mirror 66 of an example embodiment may have an elliptic shape. In this regard, the output mirror 66 has the shape of an ellipse that has a minor axis that defines the dimension of the aperture, that is, the output beam diameter, and a major axis that is a predefined multiple of mirror axis, such as 1.4 times the value of the mirror axis. The output mirror of an example embodiment has no curvature and, as a result, is flat.

Although the output mirror 66 may be configured to rotate relative to the upstanding support 14 in various manners, the optical telescope 10 of an example embodiment includes an elevation motor, such as a DC motor, disposed within and/or carried by the upstanding support. As shown in FIGS. 2 and 3, the elevation motor includes an elevation motor stator 70, an elevation motor rotor 72, and an elevation bearing, such as an elevation ball bearing pair 74. Thus, the output mirror 66 may be controllably rotated relative to the upstanding support 14. As described above with respect to the rotation of the platform 15 and the steering mirror 20, the elevation motor may be driven and the output mirror 66 may be controllably rotated under the direction of the controller 43. The optical telescope 10 of an example embodiment is also configured to determine the position, such as a rotational position, of the output mirror 66 relative to the upstanding support 14. In this regard, the optical telescope 10, such as the upstanding support 14, of an example embodiment may also include an elevation position sensor. For example, the elevation position sensor may be embodied by an encoder including, for example, an encoder hub 76, an encoder stator 78 and an encoder rotor 80 for determining the rotational position of the output mirror 66 relative to the upstanding support 14. The elevation position sensor may communicate with the controller 43 such that the controller, in turn, can direct the elevation motor in order to controllably rotate the output mirror 66 with respect to the upstanding support 14 based upon the current rotational position of the output mirror.

In the illustrated embodiment, the steering mirror 20 is configured to rotate relative to the bench 13 about first and second axes 90, 92, such as vertical and horizontal axis, respectively, in the illustrated orientation of the optical telescope 10 of FIGS. 1-3. Additionally, the output mirror 66 is configured to be controllably rotated about the second axis 92, perpendicular to the first axis. In the orientation of the optical telescope 10 depicted in FIGS. 1-3, the output mirror 66 is configured to be rotated about a horizontal axis. As a result of its rotation with the platform 15 about the first axis 90 and its rotation about the second axis 92, the steering mirror 20 of an example embodiment is configured to be redirected relative to the bench 13 so as to control the azimuthal and elevation angles, respectively, of the line of sight of the optical telescope 10, such as the azimuthal and elevation angles at which the optical signals are directed from the optical telescope. Alternatively, the rotation of the steering mirror 20 relative to the first and second axes is independent of the azimuthal and elevation angles of the line of sight of the optical telescope 10. In addition, the output mirror 66 is configured to be controllably oriented, such as by being controllably rotated, relative to the upstanding support 14 in order to correspondingly control the elevation angle of the line of sight of the optical telescope 10, such as the elevation angle of the optical signals transmitted by the optical telescope. As such, the optical telescope 10 can controllably direct the optical signals off-axis, that is, along a line of sight defined by azimuthal and elevation angles that extends in a different direction than that defined by the central axis 90 of the optical telescope 10, with a limited number of refractive optics so as to facilitate the integration of multi-spatial sensors and lasers. By controlling both the azimuthal and elevation angles of the optical telescope 10 in the manner described above, the aperture of the optical telescope and the field of regard of the optical telescope may be relatively large in at least some embodiments. For example, the optical telescope of an example embodiment may support a 9 centimeter aperture and a hemispheric field of regard.

The optical telescope 10 of an example embodiment is configured to provide open loop stabilization so as to stabilize the line of sight vector of the optical signals transmitted by the optical telescope under dynamic conditions. In order to provide the open loop stabilization, the optical telescope 10 of an example embodiment, such as a controller 43 as shown in FIG. 5, is configured to determine the inertial angular velocity with which the steering mirror 20 is rotated and the angular velocity with which the output mirror 66 is rotated. In an example embodiment, the optical telescope 10 includes one or more inertial angular rate sensors 94, such as gyro sensors, associated with the steering mirror 20 to sense the inertial angular velocity of the steering mirror and one or more inertial angular rate sensors 96, such as gyro sensors, associated with the output mirror 66 to sense the inertial angular velocity of the output mirror. By way of example, the inertial angular rate sensor(s) 94 associated with the steering mirror 20 may include first and second gyro sensors with the first and second gyro sensors oriented perpendicularly to one another so as to sense the inertial angular velocity of the steering mirror. Similarly, the inertial angular sensor(s) 96 associated with the output mirror 66 of this example embodiment may include first and second gyro sensors oriented perpendicularly to one another so as to sense the inertial angular velocity of the output mirror.

The controller 43 may be configured to direct the operation of the optical telescope 10, such as the rotational positions of the sensing mirror 20 and the output mirror 66 in various manners. In an example embodiment in which the optical telescope 10 is carried by a vehicle or other body that is in motion and in which the optical signals emitted by the optical telescope are intended to be aimed at a target, however, the controller 43 relates the rotational positions and the inertial angular velocities of the steering mirror 20 and the output mirror 66 to the position of the target in accordance with the following equation:

$$\begin{vmatrix} \dot{\theta}_{az} \\ \dot{\theta}_{el} \end{vmatrix} = \begin{vmatrix} \frac{1}{r\cos(\theta_{el})} & 0 \\ 0 & \frac{-1}{r} \end{vmatrix} \begin{vmatrix} v_x \\ v_z \end{vmatrix} + \begin{vmatrix} -\tan(\theta_{el})\sin(\theta_{az}) & -\tan(\theta_{el})\cos(\theta_{az}) & -1 \\ \cos(\theta_{az}) & -\sin(\theta_{az}) & 0 \end{vmatrix} \begin{vmatrix} \omega_p \\ \omega_y \\ \omega_r \end{vmatrix}$$

wherein $\dot{\theta}_{az}$ is the inertial angular velocity of the steering mirror 20 as determined by the inertial angular rate sensor 94, $\dot{\theta}_{el}$ is the inertial angular velocity of the output mirror 66 as determined by the inertial angular rate sensor 96, r is the range to target, $\theta_{el}$ is the rotational position of the output mirror as determined by the elevation position sensor 75, $\theta_{az}$ is the rotational position of the steering mirror as determined by the azimuthal position sensor 45, $v_x$ and $v_z$ are the relative rates in the x and y directions, respectively, of the target from the line of sight frame with respect to an earth-centered inertial frame and $\omega_p$, $\omega_y$, and $\omega_r$ are the roll, pitch and yaw rates of the body frame with respect to the earth-centered inertial frame. The values of $v_x$, $v_z$, $\omega_p$, $\omega_y$ and $\omega_r$ may be provided to the controller, such as by other systems with which the controller is in communication, such as the navigation system onboard the vehicle that carries the optical telescope 10, or may be determined by the controller, such as in regards to $v_x$ and $v_z$. Based upon the foregoing equation, the controller 43 may be configured to determine the desired rotational positions of the steering mirror 20 and the output mirror 66 in order to direct the optical signals to the target while the optical telescope 10 is carried by a vehicle or other body that is in motion. The controller 43 of the example embodiment of FIG. 5 may then direct the azimuthal motor 29 and the elevation motor 69 to rotate the steering mirror 20 and the output mirror 66, respectively, to the desired rotational positions. The controller 43 may repeat this process as the positions of the target and/or the optical telescope 10 change over time in order to insure that the optical signals remain directed at the target.

In regards to the control of the optical telescope 10 provided by a controller 43 of an example embodiment, the controller may provide both tracking control 100 and stabilization control 102 of the steering mirror 20 and the output mirror 66, as shown in FIG. 6. As described above, for example, the controller 43 of an example embodiment is configured to provide tracking control to the steering mirror 20 and the output mirror 66 based upon the current line of sight of the optical telescope 10, the location of the target and information provided by the azimuthal position sensor 45 and the elevation position sensor 75 as to the position of the steering mirror and the output mirror, respectively. The controller 43 of this example embodiment is also configured to provide stabilization control of the tracking commands based upon the information provided by the azimuthal position sensor 45 and the elevation position sensor 75 as to the position of the steering mirror 20 and the output mirror 66, respectively, and the information provided by the angular rate sensors 94, 96 as to the rates at which the steering mirror and the output mirror, respectively, are being repositioned. The commands issued by the tracking control as modified by the stabilization control 102 of the controller 43 are then utilized to appropriately position the steering mirror 20 and the output mirror 66 so as to reposition the line of sight of the optical telescope 10 to the target.

As a result of its geometric layout and its off-axis configuration, the resulting optical telescope 10 of an example embodiment provides an inertially stabilized line of sight in a relatively small and lightweight package such that the optical telescope can be utilized in many applications in which size and weight are constrained. Since the steering mirror 20 of an example embodiment is a fast steering mirror, the optical telescope 10 is also agile so as to provide high bandwidth pointing and scanning. As a result of the control provided by the controller and described above, the rotational position and/or inertial angular velocity of the steering mirror 20 may be utilized in a feed forward loop so as to stabilize residual gimbal disturbance. Thus, the optical telescope 10 of an example embodiment provides for stabilization and control over both the elevation and azimuthal angles in a relatively small and lightweight package.

Many modifications and other embodiments set forth herein will come to mind to one skilled in the art to which these embodiments pertain having the benefit of the teachings presented in the foregoing descriptions and the associated drawings. Therefore, it is to be understood that the embodiments are not to be limited to the specific ones disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

That which is claimed:

1. An optical telescope comprising:
   a steering mirror carried by and rotatable with a platform, the steering mirror configured to receive and to redirect optical signals, wherein the steering mirror is configured to be controllably oriented by rotation about first and second axes so as to control a direction in which the optical signals are redirected and to correspondingly control a line of sight of the optical telescope, wherein the first axis about which the steering mirror is configured to be rotated defines a central axis of the optical telescope about which the platform rotates and the second axis about which the steering mirror is also configured to be rotated is perpendicular to the first axis;
   a beam tube comprising a turning mirror configured to receive the optical signals from the steering mirror;

a primary mirror downstream of the turning mirror and configured to collimate the optical signals; and an output mirror configured to receive the optical signals from the primary mirror and to redirect the optical signals from the optical telescope, wherein the output mirror is configured to be controllably oriented by rotation about an axis parallel to the second axis, independent of any rotation of the primary mirror, so as to control a direction in which the optical signals are redirected and to correspondingly control an elevation angle of the line of sight of the optical telescope, and wherein the output mirror is configured to at least partially overlie the steering mirror such that the steering mirror is disposed between the output mirror and the platform, wherein the beam tube and the primary mirror are also carried by the platform with the steering mirror being more centrally positioned upon the platform than the beam tube and the primary mirror, wherein the primary mirror and the output mirror are spaced apart across the platform with the primary mirror offset from the steering mirror such that the primary mirror does not overlie the steering mirror, and wherein the beam tube is spaced apart from the steering mirror, the primary mirror and the output mirror across respective portions of the platform.

2. An optical telescope according to claim 1 further comprising a fold mirror configured to receive the optical signals from the turning mirror and to redirect the optical signals.

3. An optical telescope according to claim 2 further comprising a secondary mirror configured to receive the optical signals from the fold mirror and to redirect the optical signals to the primary mirror.

4. An optical telescope according to claim 3 wherein the secondary mirror is configured to cause the optical signals to be expanded.

5. An optical telescope according to claim 1 further comprising one or more inertial angular rate sensors associated with an azimuthal axis of the optical telescope to sense an inertial angular velocity of the steering mirror and one or more inertial angular rate sensors associated with an elevation axis of the optical telescope to sense the inertial angular velocity of the output mirror.

6. An optical telescope according to claim 1 wherein the output mirror has an elliptic shape.

7. An optical telescope comprising a base, a platform carried by the base and one or more upstanding supports extending outwardly from the platform, wherein the platform is configured to rotate relative to the base with the one or more upstanding supports rotating therewith;

a steering mirror carried by and rotatable with the platform, the steering mirror configured to receive and to redirect optical signals, wherein the steering mirror is configured to be controllably rotated relative to the base so as to control a direction in which the optical signals are redirected;

a beam tube carried by the one or more upstanding supports and comprising a turning mirror configured to receive the optical signals from the steering mirror;

a primary mirror carried by the one or more upstanding supports and positioned downstream of the turning mirror so as to collimate the optical signals; and an output mirror carried by the one or more upstanding supports and configured to receive the optical signals from the primary mirror and to redirect the optical signals from the optical telescope, wherein the output mirror is configured to be controllably rotated relative to the one or more upstanding supports, independent of any rotation of the primary mirror, so as to control a direction in which the optical signals are redirected, and wherein the output mirror is configured to extend toward a more central portion of the platform from the one or more upstanding supports so as to at least partially overlie the steering mirror such that the steering mirror is disposed between the output mirror and the platform, wherein the steering mirror is more centrally positioned upon the platform than the one or more upstanding supports and the beam tube and the primary mirror carried thereby, wherein the primary mirror and the output mirror are carried by different ones of the upstanding supports so as to be spaced apart across the platform with the primary mirror offset from the steering mirror such that the primary mirror does not overlie the steering mirror, and wherein the beam tube is spaced apart from the steering mirror, the primary mirror and the output mirror across respective portions of the platform.

8. An optical telescope according to claim 7 wherein the steering mirror is configured to rotate about first and second axes and the output mirror is configured to rotate about the second axis, perpendicular to the first axis.

9. An optical telescope according to claim 7 further comprising a fold mirror carried by the one or more upstanding supports and configured to receive the optical signals from the turning mirror and to redirect the optical signals.

10. An optical telescope according to claim 9 further comprising a secondary mirror carried by the one or more upstanding supports and configured to receive the optical signals from the fold mirror and to redirect the optical signals to the primary mirror.

11. An optical telescope according to claim 10 wherein the secondary mirror is configured to cause the optical signals to be expanded.

12. An optical telescope according to claim 7 further comprising one or more inertial angular rate sensors associated with an azimuthal axis of the optical telescope to sense an inertial angular velocity of the steering mirror and one or more inertial angular rate sensors associated with an elevation axis of the optical telescope to sense the inertial angular velocity of the output mirror.

13. An optical telescope according to claim 7 wherein the output mirror has an elliptic shape.

14. An optical telescope according to claim 7 wherein the base has a cylindrical shape.

15. An optical telescope comprising a base, a platform carried by the base and a plurality of stanchions extending outwardly from the platform and being circumferentially spaced about the platform, wherein the platform is configured to rotate relative to the base with the plurality of stanchions rotating therewith;

a steering mirror carried by and rotatable with the platform, the steering mirror configured to receive and to redirect optical signals;

a beam tube carried by a first stanchion and comprising a turning mirror configured to receive the optical signals from the steering mirror and to redirect the optical signals;

a fold mirror carried by a second stanchion and configured to receive the optical signals from the turning mirror and to redirect the optical signals;
a secondary mirror carried by a third stanchion and configured to receive the optical signals from the fold mirror and to redirect the optical signals;
a primary mirror carried by the second stanchion and configured to receive the optical signals from the secondary mirror and to collimate the optical signals; and
an output mirror carried by the third stanchion and configured to receive the optical signals from the primary mirror and to redirect the optical signals from the optical telescope, wherein the output mirror is configured to extend toward a more central portion of the platform from the third stanchion so as to at least partially overlie the steering mirror such that the steering mirror is disposed between the output mirror and the platform,
wherein the steering mirror is more centrally positioned upon the platform than the plurality of stanchions and the beam tube, the fold mirror, the secondary mirror and the primary mirror carried thereby,
wherein the primary mirror and the output mirror are spaced apart across the platform with the primary mirror offset from the steering mirror such that the primary mirror does not overlie the steering mirror, and
wherein the beam tube is spaced apart from the steering mirror and from the second and third stanchions and the fold mirror, the secondary mirror, the primary mirror and the output mirror across respective portions of the platform.

16. An optical telescope according to claim 15 wherein the steering mirror is configured to rotate about first and second axes and the output mirror is configured to rotate about the second axis, perpendicular to the first axis.

17. An optical telescope according to claim 15 wherein the secondary mirror is configured to cause the optical signals to be expanded.

18. An optical telescope according to claim 15 further comprising one or more inertial angular rate sensors associated with an azimuthal axis of the optical telescope to sense an inertial angular velocity of the steering mirror and one or more inertial angular rate sensors associated with an elevation angle of the optical telescope to sense the inertial angular velocity of the output mirror.

19. An optical telescope according to claim 15 wherein the base has a cylindrical shape.

* * * * *